Figure 6:
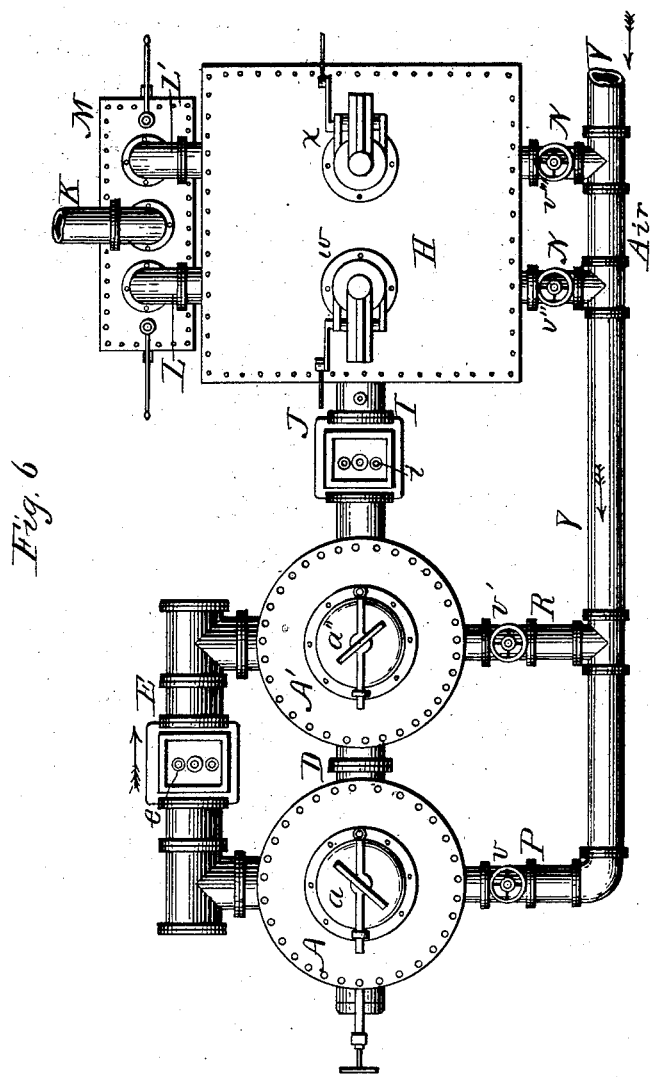

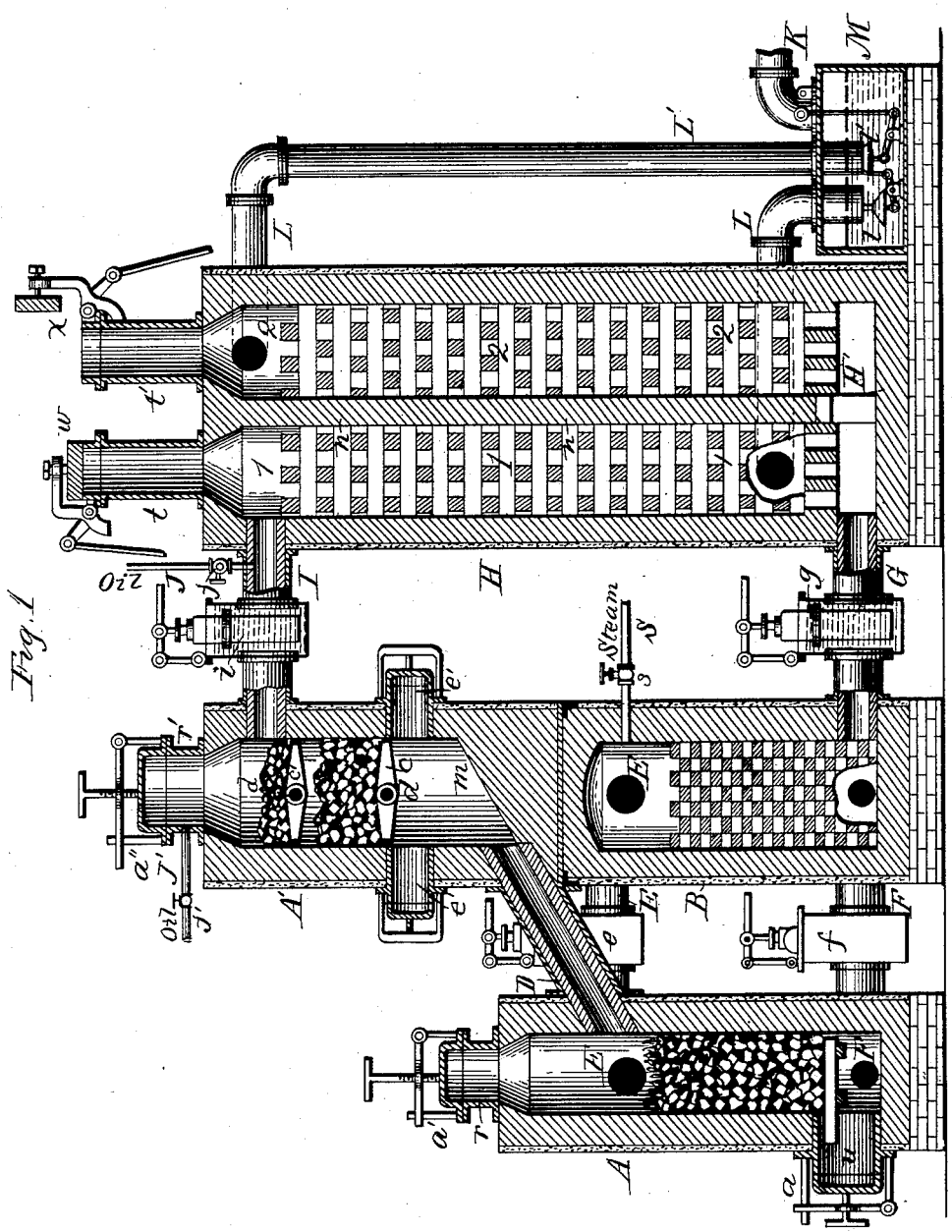

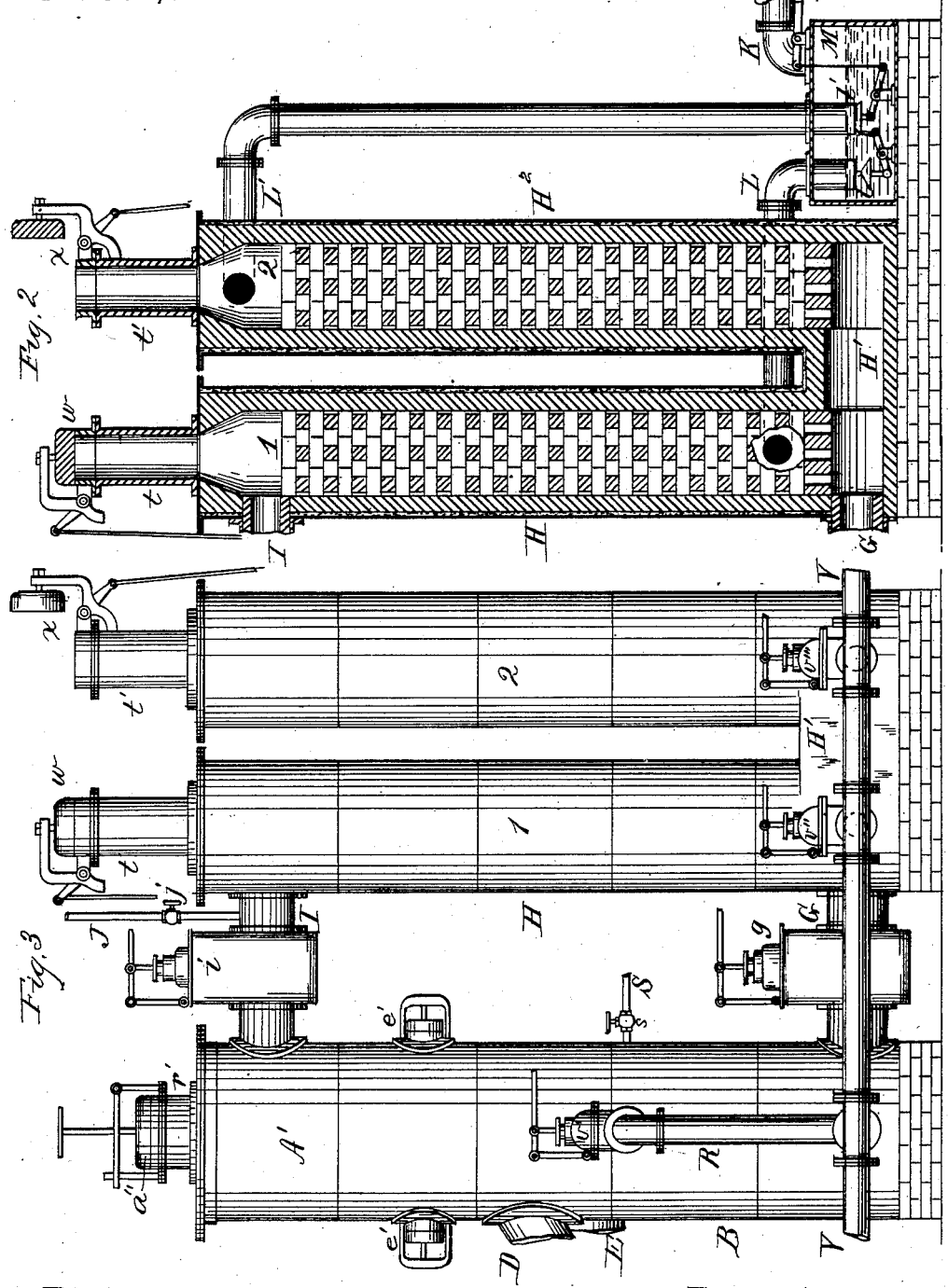

(No Model.) 5 Sheets—Sheet 3.
J. HANLON.
APPARATUS FOR MANUFACTURING ILLUMINATING AND HEATING GAS.
No. 367,620. Patented Aug. 2, 1887.
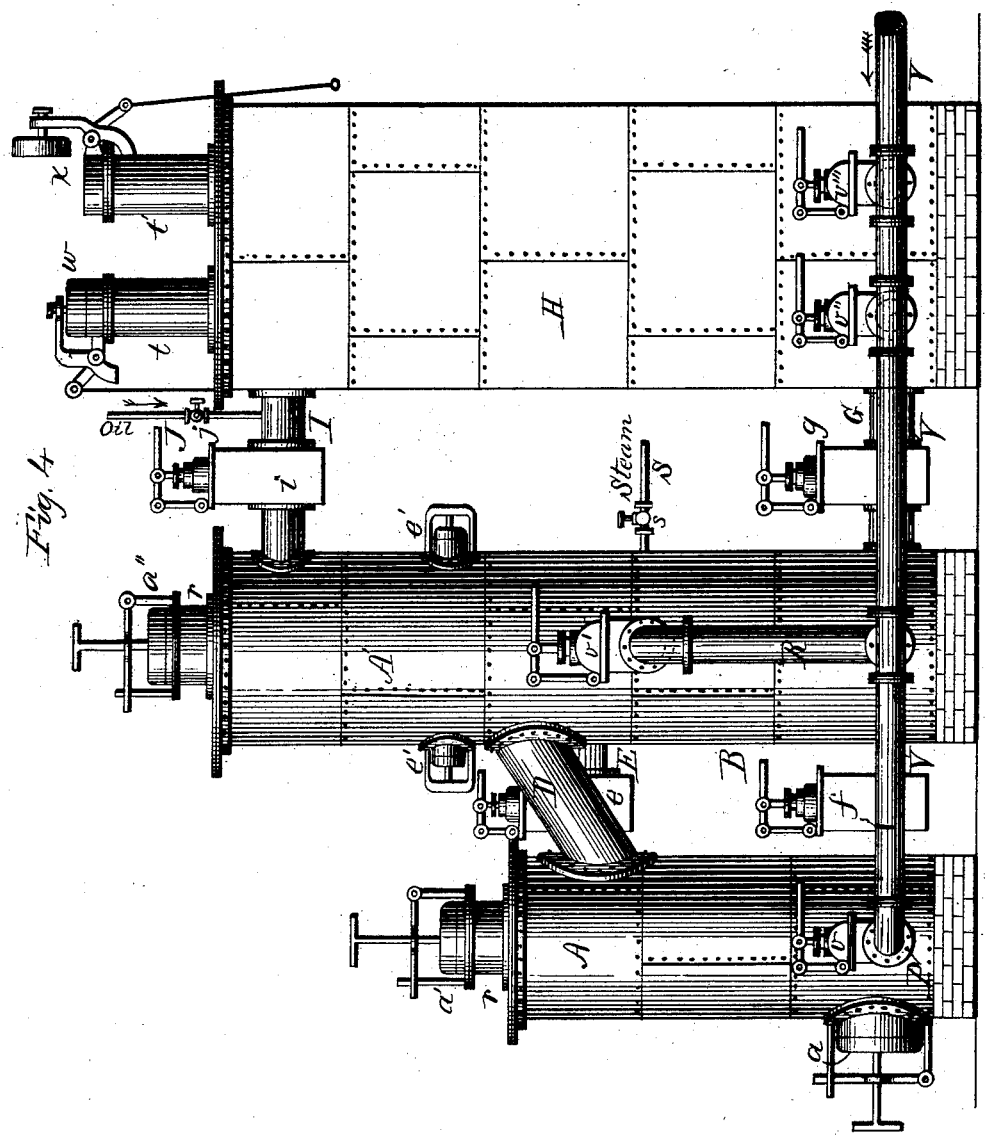

(No Model.) 5 Sheets—Sheet 4.
J. HANLON.
APPARATUS FOR MANUFACTURING ILLUMINATING AND HEATING GAS.
No. 367,620. Patented Aug. 2, 1887.
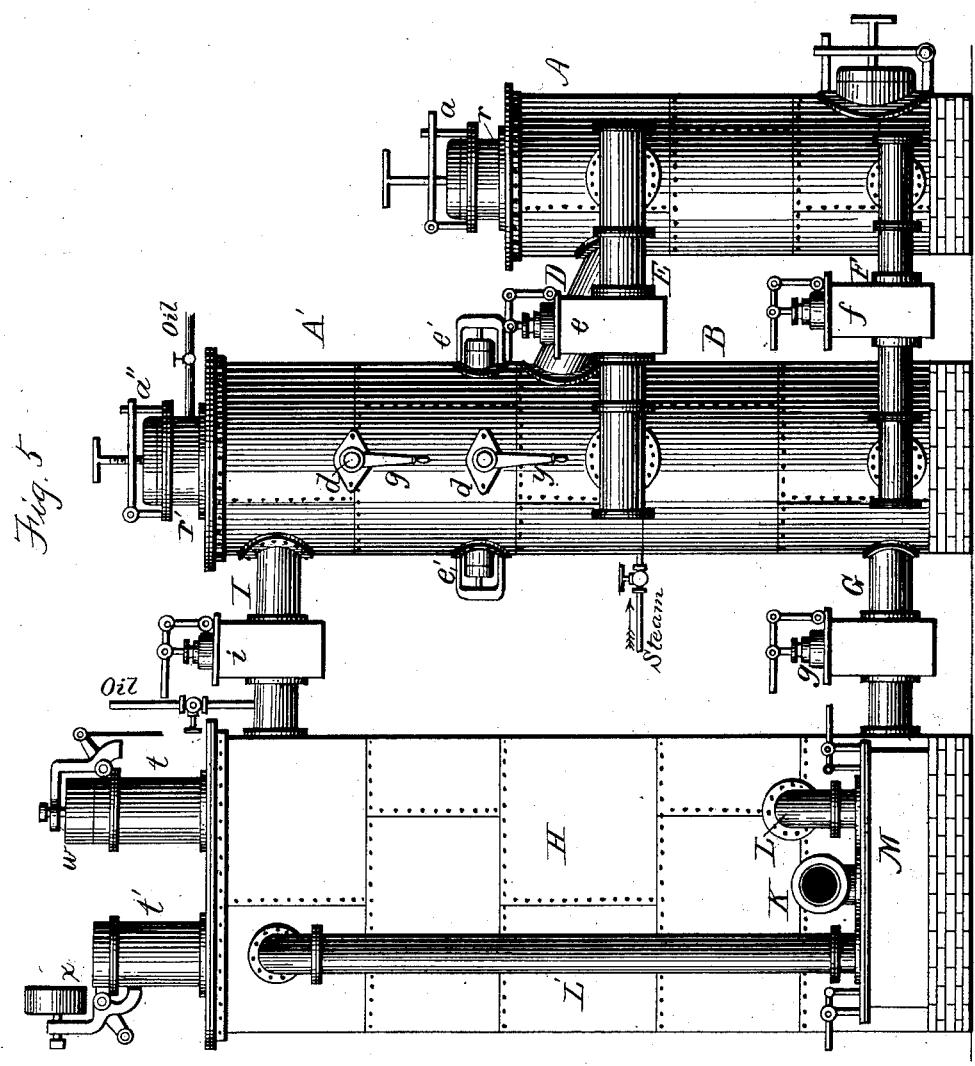

(No Model.)

5 Sheets—Sheet 5.

J. HANLON.
APPARATUS FOR MANUFACTURING ILLUMINATING AND HEATING GAS.

No. 367,620. Patented Aug. 2, 1887.

Witnesses
B. R. Catlin
O. F. Mason

Inventor
John Hanlon
By E. B. Clark
atty.

UNITED STATES PATENT OFFICE.

JOHN HANLON, OF NEW YORK, N. Y.

APPARATUS FOR MANUFACTURING ILLUMINATING AND HEATING GAS.

SPECIFICATION forming part of Letters Patent No. 367,620, dated August 2, 1887.

Application filed September 24, 1886. Serial No. 214,451. (No model.)

*To all whom it may concern:*

Be it known that I, JOHN HANLON, a citizen of the United States, residing at New York, in the county of New York and State of New York, have invented certain new and useful Improvements in Apparatus for Manufacturing Illuminating and Heating Gas; and I do hereby declare the following to be a full, clear, and exact description of the invention, such as will enable others skilled in the art to which it appertains to make and use the same.

This invention relates to apparatus for manufacturing illuminating and heating gas, such apparatus being adapted to superheat steam, then decompose it by contact with incandescent fuel, thereby forming water-gas to distill bituminous or soft coal by passing the hot water-gas through it in a separate chamber, thereby enriching the gas with carbureted hydrogen gas and vapors from the coal, and at the same time forming coke suitable for use in the steam-decomposing chamber, to carburet the water-gas with hydrocarbon oil or vapor, and, finally, to combine the gases and vapors and convert them into a fixed gas.

The object of the invention is to provide improved means for distilling or utilizing bituminous or soft coal in a water-gas generator, whereby such coal is subjected to contact with and the distilling action only of hot-water gas, and is freed from the contaminating and wasteful influence of products of combustion arising from the steam-decomposing chamber when it is being blasted with air.
Another object is to conveniently unite in one structure the steam-superheater and the coal-distilling chamber, and so connect these chambers with the decomposing-chamber that products of combustion and water-gas are conducted separately from the latter directly to the superheater and distilling-chamber, respectively, and that coke may be readily discharged from the distilling-chamber directly into the decomposing-chamber.
My invention embraces a novel construction and arrangement of parts for conveniently and economically carrying out the above-stated objects, and also includes certain details of construction, whereby improved results are secured, as will be fully described, and then particularly pointed out in the claims.

In the accompanying drawings, Figure 1 represents a longitudinal vertical section of the apparatus. Fig. 2 represents a vertical section of the fixing-chambers, each in a separate inclosing-wall and iron jacket. Fig. 3 represents an elevation of part of the apparatus, showing the separate fixing-chambers. Fig. 4 represents a side elevation of the apparatus, showing the generator A at the left. Fig. 5 represents an elevation of the apparatus on the side opposite to that shown in Fig. 4, and showing the generator A at the right. Fig. 6 represents a top plan view.

All the chambers of the apparatus are built of fire-brick surrounded by tight iron jackets in the usual manner and mounted upon masonry foundations. The generator A is provided with the usual grate and ash-pit, and with ash-opening $u$, having a tight-closing door, $a$, at the base, and with the fuel-neck or mouth-piece $r$ having tight-closing lid $a'$ at the top. The coal-distilling chamber A' and steam-superheating chamber B are built in one structure with the distilling-chamber at the top, as shown. Chamber A' has an inclined bottom, $m$, extending downward toward generator A, and the inclined pipe D extends downward on a line with such bottom and connects with the upper portion of the decomposing or generating chamber A. Openings $e'\ e'$ having tight-fitting caps are formed in the base of chamber A' to afford access thereto for inspecting, cleaning, or repairing the chamber or grate $c$ and for pushing the coke, if necessary, into chamber A. Two or more grates, $c\ c'$, are mounted upon the central hollow shafts, $d$ $d$, in chamber A' for supporting beds of coal. Shafts $d$ are made hollow for the circulation of water to protect them from injury by heat, and they are provided at one end, outside of the wall, with handles $y\ y$, for tilting them and dumping their charges of coal or coke. The neck $r'$ and tight-closing lid $a''$, having securing devices, are applied to the top of chamber A' as means for supplying coal to the grates. The steam-superheater B is suitably filled with brick checker-work, and has connecting at its top the steam-supply pipe S, having valve $s$. Pipe E, having water-cooled valve $e$, connects the top of chamber B with the upper portion of generator A and serves for the passage of products of combustion into the superheater. Pipe F, having water-cooled valve $f$, connects the base or ash-pit of generator A with the base of superheater B, and serves for the passage of superheated steam to the generator. The pipes E and F connect with the sides of the chambers, as shown in Figs. 5 and 6. The base of the superheater is connected to the base H' of the fixing-chambers by pipe G, having water-cooled valve $g$, for the passage of products of combustion to the latter chambers.

The top of distilling-chamber A' is connected to the top of fixing-chamber 1 by pipe I, having water-cooled valve $i$ for conducting carbureted gas into the fixing-chamber. A hydrocarbon-oil-supply pipe, J, having valve $j$, opens into pipe I. An oil-supply pipe, J', having valve $j'$, may also connect with neck $r'$, for admitting oil into the coal-distilling chamber for carbureting the water-gas. The fixing-chambers 1 2 may be built in one structure, having a single inclosing wall or shell, H, and a division-wall, $n$, as shown in Figs. 1, 4, and 6; but they are preferably built separately in two shells, H H'', mounted upon a connecting-base, H', as shown in Figs. 2 and 3. Chamber 1 has a neck, $t$, and cap $w$, and chamber 2 has neck $t'$ and cap $x$, and to these caps are connected the usual hinged operating devices. Chamber 1 is connected by pipe L, leading from its base, with the hydraulic-seal box M, and chamber 2 is connected by pipe L', leading from its top, with the same box M. The pipes project down into the sealing-liquid in the box, and conical valves $l\ l'$ are pivotally mounted in the box so as to close the lower ends of the pipes. Operating mechanism for the valves connect with levers or handles outside the box. Either pipe may thus be positively closed, and the gas caused to flow from one fixing-chamber only at a time through one of the pipes. Pipe K conducts gas to the scrubber or purifier. The main air-blast pipe V (shown in Figs. 4 and 6) connects by branch pipe P, having valve $v$, with the ash-pit of generator A by branch pipe R, having valve $v'$, with the top of superheater B, and by branch pipes N N, having valves $v''\ v'''$, with the bases of fixing-chambers 1 and 2. One side of each of the boxes surrounding valves $i$ and $g$ is removed, so as to show the water surrounding the valve-casing. The valves have the usual pivoted links and levers connecting with their stems for operating them. The connecting-pipes D, E, F, and I are lined with fire-brick, fire-clay, or other refractory material.

The operation can now be understood as follows: A fire is kindled and allowed to burn at first by natural draft till a body of coal is well lighted, and then before the air-blast is admitted the valves and caps are arranged as follows: Valves $e$ and $g$ and cap $w$ are opened, and all the other valves, cap, doors, and lids are closed. The air-blast is now admitted by pipe P and valve $v$ to the ash-pit of the generator, and is continued till a deep body of fuel is raised to incandescence, fuel being fed in occasionally, as required. The gaseous products escaping from the fuel pass by pipe E into chamber B, and are there burned by admitting the air-blast through pipe R and valve $v'$, the resulting hot products passing by pipe G into chamber 1 of the superheater, where they heat the contained brick checker-work. As soon as chamber B is sufficiently heated the air-blast may be partially or wholly shut off therefrom and admitted to chamber 1, causing combustion therein till it is properly heated, when its cap $w$ is closed and cap $x$ at the same time opened. The air-blast is then admitted to chamber 2, and combustion of gaseous products caused to take place therein till it is heated to the desired temperature. All the hot gaseous products flow through chamber B, and it is therefore most highly heated, as desired, for subsequent use in superheating steam. The bed of fuel and the chambers being heated to the required temperature, the air-blast valves are all closed, and valves $e$ and $g$ and caps $w\ x$ are closed. Either before or after the application of the air-blasts the grates of coal-distilling chamber A' are charged with bituminous coal. Now, before admitting steam to valve $l$ of take-off pipe L, while valve $l'$ is closed, valves $f$ and $i$ are opened and steam is admitted to the superheater by opening valve $s$. It is highly superheated by passage through the brick-work, and then passes by way of pipe F into the incandescent fuel, where it is decomposed. The resulting hot water-gas flows up through the beds of bituminous coal, causing hydrocarbon gases and vapors to distill off. These gases and vapors are carried by the water-gas into fixing-chamber 1, where conversion into a fixed gas takes place. The volatile matter is thus driven out of bituminous coal at the proper temperature to prevent the formation of lamp-black and in such manner as to advantageously utilize all the volatile hydrocarbons and prevent the baking of tar in the form of hard carbon upon the walls of the distilling-chamber. The coal is thus gradually coked, and when sufficiently freed from volatile matter is dumped from the lower grate onto the inclined bottom $m$, from which it slides down through the inclined pipe or chute D into the generator A to maintain the proper depth of fuel-body therein. After the coke is dumped from grate $c$ such grate receives a partially-distilled charge from the upper grate, $c'$, which in turn receives a fresh charge of coal through the neck or passage $r'$, the lid $a''$ for such purpose being opened. In case the water-gas is not sufficiently carbureted by the hydrocarbons distilled from the coal, hydrocarbon oil is admitted by pipe J into the gas flowing through pipe I, or the oil is admitted by pipe J upon the surface of the coal in chamber A'. The gas and vapors are combined and converted into a homogeneous fixed gas in chamber 1, and such gas is passed off by pipe L to the seal-box, and then passes to the scrubber, purifier, and holder. So long as the gas is properly fixed in chamber 1 it is conducted off directly by pipe L; but when such chamber is reduced too low in temperature for efficient action, valve $l$ is closed and valve $l'$ is opened and the gas passed up through chamber 2, where conversion to a fixed gas takes place to the end of the run. The manufacture of gas continues ten, fifteen, or twenty minutes, according as the temperature is maintained and efficient decomposition and conversion take place. This constitutes a run. When the apparatus becomes cooled below an efficient working temperature, the valves and caps are reversed, the steam and oil shut off, the air-blasts are again admitted, and the apparatus is heated up, as before explained.

The distilling-chamber, owing to its location and the arrangement of pipes, is subjected to little or no additional heat while the remainder of the apparatus is being heated, the products of combustion do not pass in contact with the soft coal, and the valuable hydrocarbon vapors of such coal are not wasted by mingling with and passing off with the products of combustion from the generator while the latter is being blasted with air.

By the construction of apparatus shown and the operation described bituminous coal can be used to fine advantage in a water-gas producer, while attempts heretofore made in this direction have resulted in failure or only partial success.

Having described my invention, what I claim, and desire to secure by Letters Patent, is—

1. In combination with a water-gas generator, a connected coal-distilling chamber having one or more dumping-grates for supporting the coal to be distilled, a pipe connecting the distilling and generating chambers for feeding coke to the latter, and for the passage of hot water-gas up into the coal, and a separate valved pipe for products of combustion leading from the generator.

2. The combination of the water-gas generator and connected coal-distilling chamber with a steam-superheating chamber having a steam-supply pipe, and valved pipes connecting such chamber at top and bottom with the generator, for the purpose described.

3. The water-gas generator and the separate coal-distilling chamber connected by inclined pipe D, in combination with the fixing-chamber connecting with the coal-distilling chamber by valved pipe I, and a separate valved pipe for products of combustion leading from the generator, for the purpose described.

4. The combination of the water-gas generator and the separate connected coal-distilling chamber with a gas-fixing chamber, a valved pipe connecting the distilling-chamber with the fixing-chamber, an oil-supply pipe connecting with the distilling-chamber, or its gas-exit pipe for supplying oil to carburet the water-gas, and a separate pipe for products of combustion leading from the generator, for the purpose described.

5. The combination of a water-gas generator and connected coal-distilling chamber with a steam-superheating chamber and a gas-fixing chamber, valved pipes connecting the fixing-chamber with the distilling-chamber and with the steam-superheater, and valved pipes connecting the superheater at top and bottom with the generator, as and for the purpose described.

6. The coal-distilling chamber and steam-superheating chamber built in one structure with a closed partition between them, the distilling-chamber being at the top and having its floor inclined toward the generator, in combination with the generating-chamber, and inclined pipe D, leading from the inclined floor of the distilling-chamber to the generator, for the purpose described.

In testimony whereof I affix my signature in presence of two witnesses.

JOHN HANLON.

Witnesses:
C. K. LEONARD,
GEO. D. STINEBAUGH.